United States Patent
Combe et al.

(10) Patent No.: US 10,295,210 B2
(45) Date of Patent: May 21, 2019

(54) USER INTERFACE FOR AN ENVIRONMENTAL CONTROL SYSTEM

(71) Applicant: British Gas Trading Limited, Windsor, Berkshire (GB)

(72) Inventors: Nicola Combe, London (GB); Curtis John Collinsworth, Sausalito, CA (US); Brett Derek Middleton, Oakland, CA (US); Hideaki Matsui, San Francisco, CA (US)

(73) Assignee: BRITISH GAS TRADING LIMITED, Windsor (GB)

( * ) Notice: Subject to any disclaimer, the term of this patent is extended or adjusted under 35 U.S.C. 154(b) by 260 days.

(21) Appl. No.: 14/797,672

(22) Filed: Jul. 13, 2015

(65) Prior Publication Data

US 2017/0016643 A1    Jan. 19, 2017

(51) Int. Cl.
*F24F 11/30* (2018.01)
*G05D 23/19* (2006.01)
(Continued)

(52) U.S. Cl.
CPC .............. *F24F 11/30* (2018.01); *F24F 11/62* (2018.01); *F24F 11/65* (2018.01); *G05B 15/02* (2013.01);
(Continued)

(58) Field of Classification Search
CPC .......... F24F 11/006; F24F 11/30; F24F 11/62; G05B 15/02; G05D 23/1904; G05G 1/00; H01H 37/00
(Continued)

(56) References Cited

U.S. PATENT DOCUMENTS

| 7,584,899 B2 | 9/2009 | Pauw et al. |
| 7,726,581 B2 | 6/2010 | Naujok et al. |

(Continued)

FOREIGN PATENT DOCUMENTS

| EP | 2 857 921 A1 | 4/2015 |
| WO | 2011/128416 A2 | 10/2011 |
| WO | 2013058820 A1 | 4/2013 |

OTHER PUBLICATIONS

PCT International Search Report and Written Opinion from International Application No. PCT/GB2016/052096, dated Sep. 30, 2016, 17 pages.

*Primary Examiner* — Kenneth M Lo
*Assistant Examiner* — Michael W Choi
(74) *Attorney, Agent, or Firm* — Tucker Ellis LLP; Michael G. Craig

(57) ABSTRACT

A method of configuring a control schedule for an environmental control system using a control device is disclosed. The control device has a display and a directional input element such as a rotary dial. The method involves performing a time period configuration process for a sequence of time periods. A time period is added to the control schedule and a representation of the added time period is displayed. In response to directional activation of the directional input element, a duration of the added time period is adjusted, with the representation being updated to indicate the adjusted duration. The adjusted duration is stored in response to a confirmation input signal. The time period configuration process is repeated until it is determined that no more time periods are to be added to the control schedule.

16 Claims, 11 Drawing Sheets

Figure 1A:
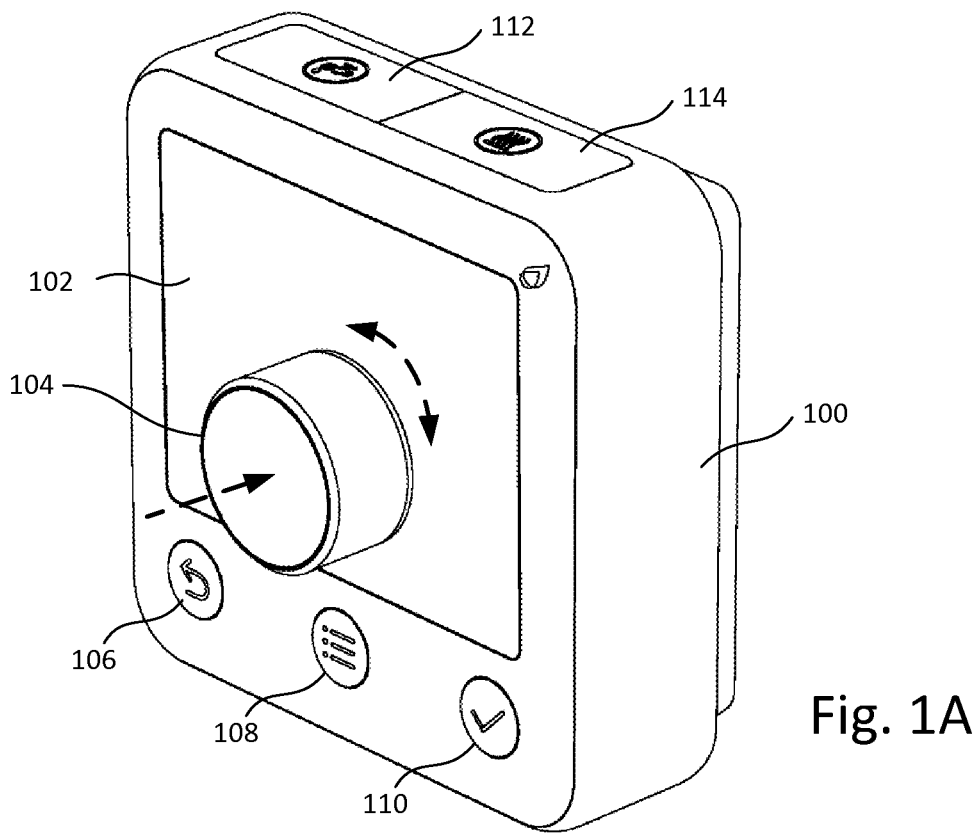

| Start time | End time | Heating | Temperature |
|---|---|---|---|
| 00:00 | 07:30 | Off / F.P. | - |
| 07:30 | 09:30 | On | 20 |
| 09:30 | 19:00 | Off / F.P | - |
| 19:00 | 22:00 | On | 18.5 |
| 22:00 | 00:00 | Off / F.P | - |

(51) Int. Cl.
  *G05G 1/00* (2006.01)
  *H01H 37/00* (2006.01)
  *G05B 15/02* (2006.01)
  *F24F 11/62* (2018.01)
  *F24F 11/65* (2018.01)

(52) U.S. Cl.
  CPC ........... G05D 23/1904 (2013.01); G05G 1/00 (2013.01); H01H 37/00 (2013.01); *G05B 2219/2614* (2013.01)

(58) Field of Classification Search
  USPC ........................................................ 700/276
  See application file for complete search history.

(56) References Cited

U.S. PATENT DOCUMENTS

| | | | |
|---|---|---|---|
| 2005/0119765 A1 | 6/2005 | Bergman et al. | |
| 2005/0199737 A1 | 9/2005 | Pauw et al. | |
| 2006/0192021 A1* | 8/2006 | Schultz | G05D 23/1904 236/1 C |
| 2010/0116224 A1* | 5/2010 | Leeland | F24H 9/2035 122/14.21 |
| 2011/0257795 A1 | 10/2011 | Narayanamurthy et al. | |
| 2012/0165993 A1 | 6/2012 | Whitehouse | |
| 2013/0027412 A1* | 1/2013 | Roddy | F24F 11/0086 345/501 |
| 2013/0046397 A1 | 2/2013 | Fadell et al. | |
| 2013/0099009 A1 | 4/2013 | Filson et al. | |
| 2013/0263034 A1* | 10/2013 | Bruck | F24F 11/0086 715/771 |
| 2013/0345882 A1* | 12/2013 | Dushane | G05B 15/02 700/276 |
| 2014/0005837 A1 | 1/2014 | Fadell et al. | |
| 2014/0316581 A1 | 10/2014 | Fadell et al. | |
| 2014/0316584 A1 | 10/2014 | Matsuoka et al. | |
| 2014/0319232 A1 | 10/2014 | Gourlay et al. | |
| 2015/0005953 A1* | 1/2015 | Fadell | F24F 11/30 700/276 |
| 2015/0148965 A1 | 5/2015 | Lemire et al. | |

\* cited by examiner

| Start time | End time | Heating | Temperature |
|---|---|---|---|
| 00:00 | 07:30 | Off / F.P. | - |
| 07:30 | 09:30 | On | 20 |
| 09:30 | 19:00 | Off / F.P | - |
| 19:00 | 22:00 | On | 18.5 |
| 22:00 | 00:00 | Off / F.P | - |

Fig. 4

USER INTERFACE FOR AN ENVIRONMENTAL CONTROL SYSTEM

BACKGROUND

Central heating systems often provide the facility to configure heating and hot water schedules. For example, a user may wish to program the heating to be on during the early morning, and again in the evening, but off during the day when nobody is home, or during the night. Past solutions have included mechanical timers directly integrated into the boiler, as well as digital control devices connected to the boiler. However, such systems have often been cumbersome and awkward to use due to the limitations of their user interfaces, and are generally limited in flexibility.

Some modern systems allow schedules to be programmed from a personal computer, tablet PC or smartphone, for example using a web interface or application. While this can provide flexibility, it introduces reliance on additional devices and home networking infrastructure, and may not be convenient for all users.

Interactions other than schedule programming are also affected by the limitations of past approaches.

SUMMARY

The present invention relates to user interfaces for environmental control systems such as heating systems and hot water supply systems.

Accordingly, in a first aspect of the invention, there is provided a method of configuring a control schedule for an environmental control system using a control device, the control device having a display and a directional input element for receiving user input corresponding to at least two distinct activation directions of the directional input element, and wherein the control schedule is configurable to define a sequence of time periods, the method comprising: performing a time period configuration process for each of a plurality of time periods of the schedule, the time period configuration process including, for each time period being configured: adding a time period to the control schedule; displaying on the display a representation of the added time period, the representation preferably being displayed adjacent a representation of a temporally preceding time period of the control schedule if the added time period is not an earliest configured time period of the control schedule; in response to directional activation of the directional input element, adjusting a duration of the added time period, and updating the representation to indicate the adjusted duration of the added time period; and in response to receiving a confirmation input signal, storing the adjusted duration of the given time period in the control schedule; the method comprising repeating the time period configuration process until it is determined that no more time periods are to be added to the control schedule.

DRAWINGS

Figure 1B:
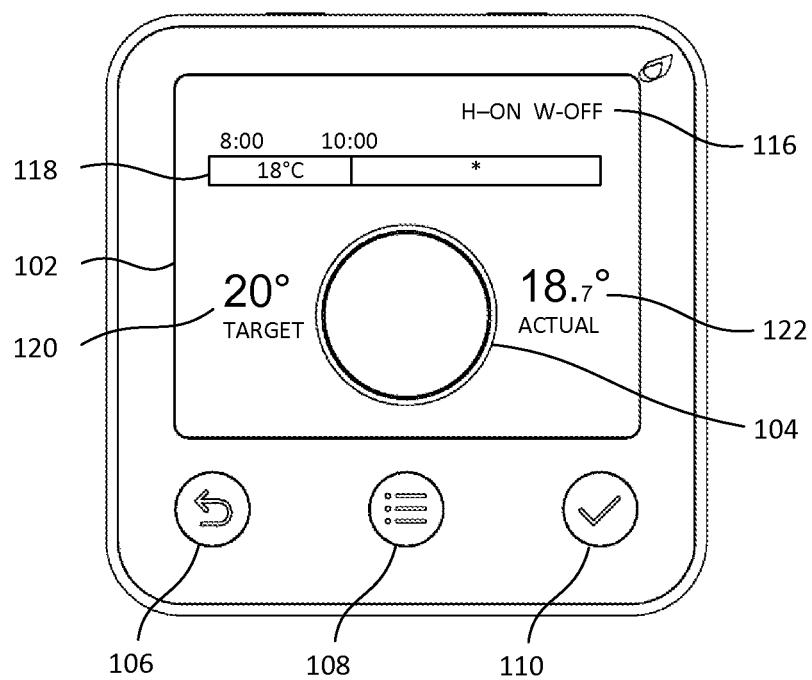
Figure 5A:
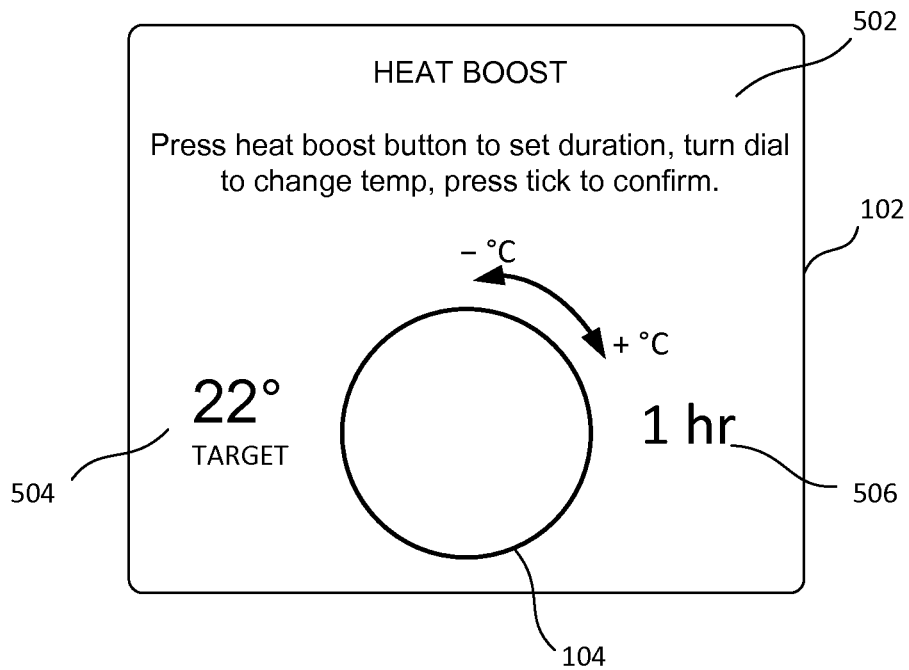
Figure 5B:
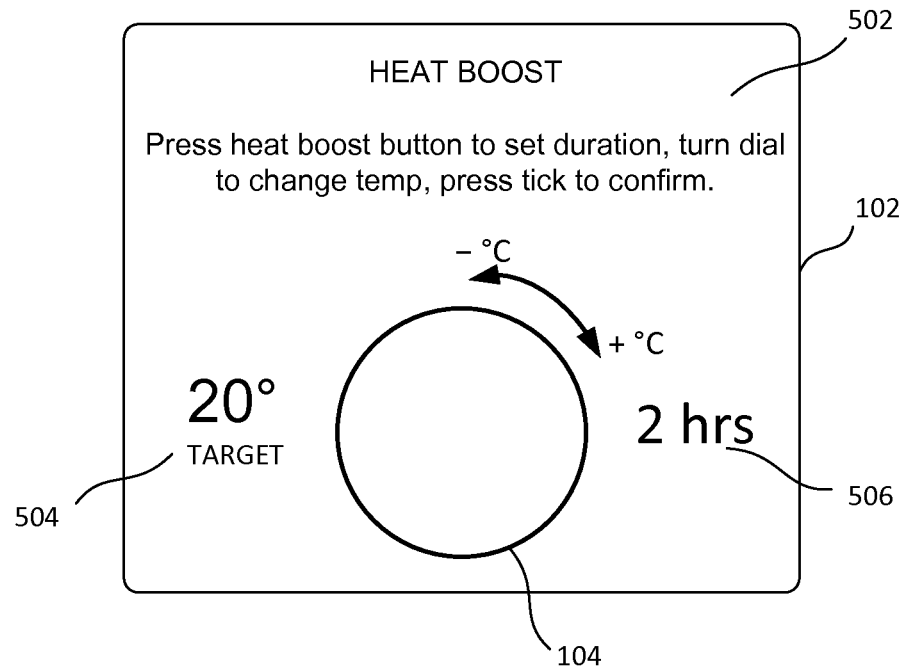
Figure 6:
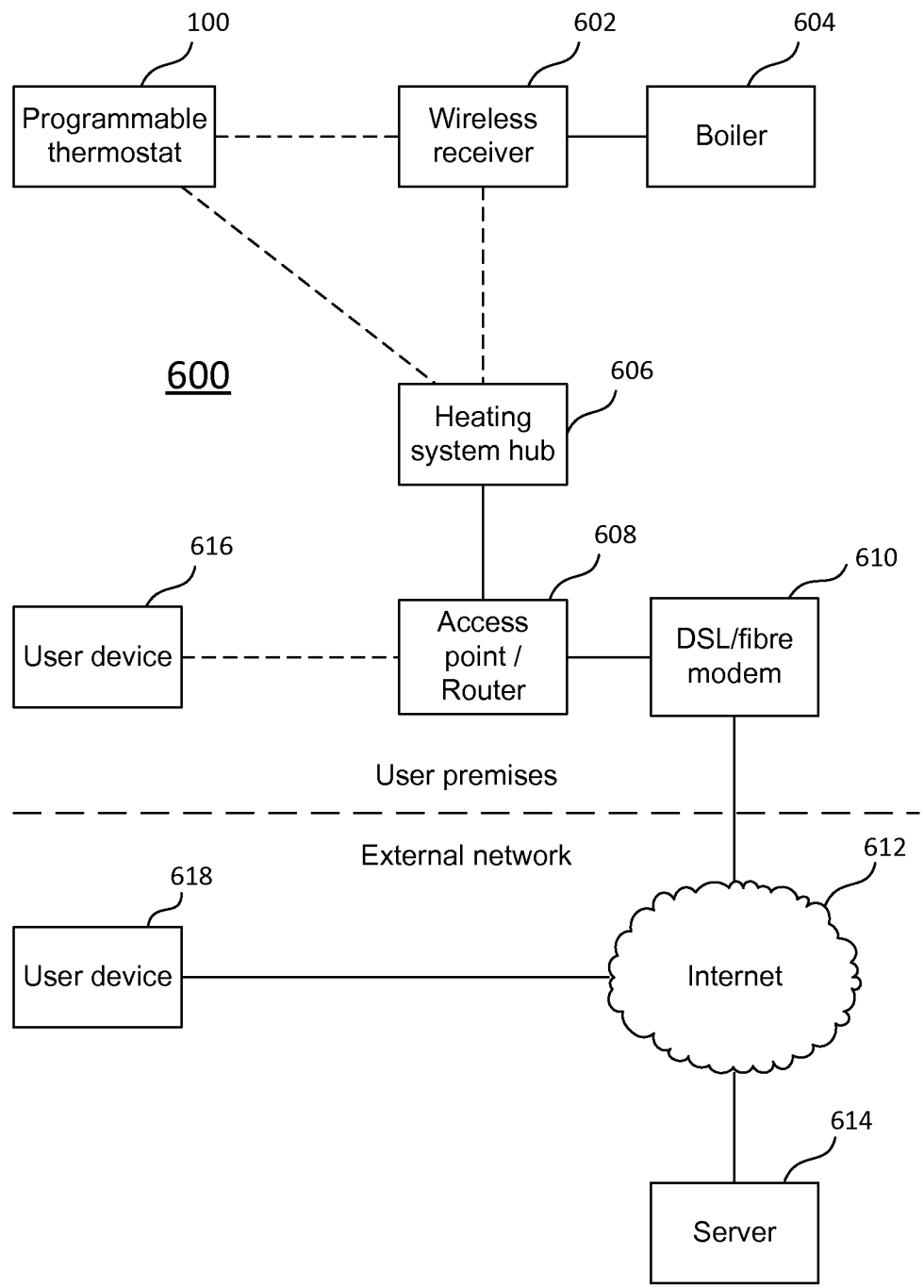
Figure 7:
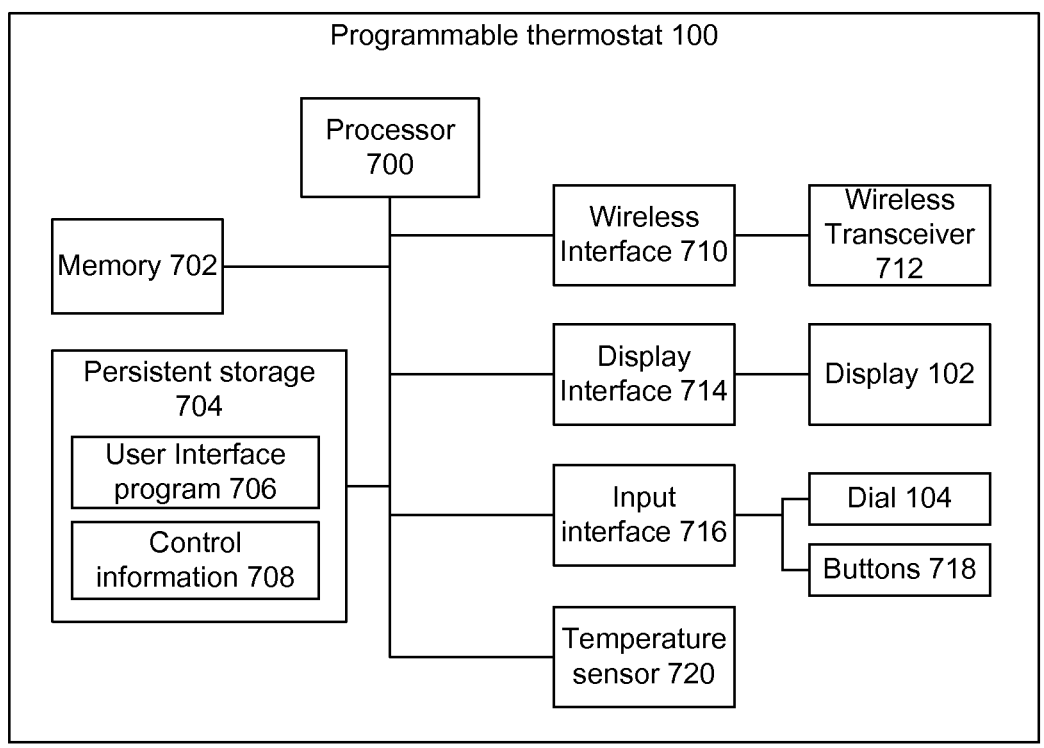

Preferred features of the present invention will now be described, purely by way of example, with reference to the accompanying drawings, in which:

FIGS. 1A and 1B show a programmable thermostat;
FIGS. 2A-2I illustrate configuration of a heating schedule using a schedule programming interface of the thermostat;
FIG. 3 is a process diagram summarising the schedule programming process;
FIG. 4 illustrates a heating schedule;
FIGS. 5A and 5B illustrate a boost function of the thermostat;
FIG. 6 illustrates a heating system and network environment within which the thermostat may be used; and
FIG. 7 illustrates a hardware architecture of the thermostat.

DETAILED DESCRIPTION

In some aspects, as used herein, the term directional input element refers to a physical input component providing input signals representative of different adjustment directions. Specifically, different activation directions of the directional input element preferably correspond to adjustment directions of a parameter being adjusted, where the parameter may be a time parameter (e.g. start/end time or duration) or control parameter (such as a temperature value). Activation in a first direction preferably corresponds to reducing a value of a parameter (e.g. shortening a time period or lowering a temperature value) and activation in a second direction corresponds to increasing a value of a parameter (e.g. lengthening a time period or increasing a temperature value).

The directional input element is preferably a rotary input element (such as a dial) for receiving rotary input corresponding to two distinct rotation directions (typically clockwise to increase a value/anticlockwise to reduce a value). However, other forms of directional input element may be used as the directional input element, such as rocker buttons/switches, thumbwheels, trackballs and the like; while the input element preferably takes the form of a single (integrated, discrete) input component, multiple discrete components such as buttons representative of different adjustment directions could alternatively also be used.

The control device is preferably a standalone control device specifically adapted for controlling the environmental control system, preferably a heating system controller or thermostat.

The method preferably comprises repeating the time configuration process for a temporal sequence of time periods starting with an earliest time period, preferably in time order of the time periods. Thus, each added time period is preferably defined to temporally follow a preceding added time period. In this way, a schedule can be conveniently constructed time period by time period. The time periods are preferably continuous (without time gaps between successive time periods) and/or non-overlapping.

The method may comprise, for a first time period of the schedule to be added, configuring a start time of the first time period based on user input provided by directional activation of the directional input element, the time period configuration process adding the first time period with the configured start time. This sets a start time of the schedule and is thus typically performed prior to addition of any time periods.

The method may further comprise, for a time period other than the first configured time period, setting a start time of the time period to an end time of the temporally preceding time period when adding the time period.

Preferably, adjusting the duration of the added time period comprises adjusting an end time of the added time period (alternatively/equivalently, an explicit duration value may be adjusted). The adjustment and updating of the display representation may be performed repeatedly in response to repeated input from the directional input element, e.g. until receipt of a separate confirmation input.

Preferably, the method further comprises associating control information with one or more (optionally each) of the configured time periods. The control information associated with a time period is preferably used to control the environmental control system during that time period. Associating control information with one or more time periods may comprise associating with each time period at least one of: an indication that the environmental control system is to be deactivated and/or in a protection mode during the time period (an "OFF" period); an indication that the environmental control system is to be activated during the time period (an "ON" period); and a temperature parameter indicating a target temperature to be used during the time period. For example, for environmental temperature control (e.g. in a heating system), target temperatures may be associated with one or more time periods during which temperature control is to be performed (other time periods optionally designated as inactive periods). For control of a water heating system, a simple on/off indication may be associated with each time period.

The temperature parameter may be in the form of a temperature value in accordance with a standard temperature unit or scale (e.g. Celsius/Fahrenheit). Alternatively any other type of temperature indication may be used (e.g. predefined settings such as cool/medium/hot). Furthermore, the invention (in any of its aspects set out) may be adapted for configuring control parameters other than temperature parameters, and any reference herein to temperature parameters, temperature values or target temperatures shall be construed accordingly and such references may be substituted with references to control parameters/control values in general.

The time period configuration process may comprise, for a time period during which the environmental control system is to be activated, associating a target temperature value with the time period based on directional input from the directional input element. Using the same directional input both for setting a time period duration and a target temperature value greatly simplifies the user interface and enables more efficient and accurate schedule configuration.

Thus, the method preferably comprises, in a first stage of the time period configuration process, allowing a user to adjust one of a time parameter and a target temperature value for the time period based on directional input from the directional input element, and, responsive to a confirmation input signal: in a second stage of the time period configuration process, allowing the user to adjust the other one of the time parameter and target temperature value for the time period based on directional input from the directional input element. Either the time parameter (e.g. duration) or temperature value may thus be the first parameter configured, with the interface switching to configure the other parameter once the first parameter entry has been confirmed. A further confirmation input signal preferably confirms the second parameter entry, which may end the time period configuration process for that time period, with the method optionally proceeding to configuration of a subsequent time period.

The method preferably comprises determining that no more time periods are to be added to the control schedule based on one of: a predetermined limit limiting a number of time periods that can be added to the schedule; and a user input.

Preferably, control information associated with the control schedule designates each time period as one of: an ON period during which the environmental control system is to be activated and/or to operate in accordance with a control parameter (e.g. target temperature) configured in the control schedule; and an OFF period during which the environmental control system is to be deactivated and/or to operate in a protection mode. The protection mode is preferably a mode in which the environmental control system is generally inactive (e.g. no heating is performed), except to an extent necessary to protect system equipment from damage. More specifically, the protection mode may involve operating a heating system in accordance with a protection threshold, such that the heating is generally off, but is activated if a measured temperature falls below the protection threshold (e.g. to prevent frost damage to equipment). Thus, the term "OFF period" and other references throughout this document to the system being in an "OFF" or inactive state should be interpreted to include such a protection mode.

The time periods added by the time period configuration process preferably alternate between ON and OFF periods, preferably wherein the first added period is an ON period. The time period configuration process preferably comprises setting a target temperature control parameter based on user input for any ON periods but not for any OFF periods. Thus, when an ON period is added to the schedule, the method may comprise setting a target temperature value for the period to a default value, displaying an indication of the default value, and allowing a user to adjust the target temperature value based on directional input from the directional input element, the method preferably further comprising storing the default value or adjusted value in response to a confirmation input signal. When an OFF period is added to the schedule, the method may involve allowing a user to adjust only the duration of the time period based on directional input from the directional input element.

The time periods in the schedule may be defined in relation to a predetermined time extent, preferably a day. The method may include, when it is determined that no more time periods are to be added to the control schedule by the user, defining (automatically) one or more OFF periods in the control schedule corresponding to one or more time intervals of the predetermined time extent which are not included in any configured time periods. In this way, the user-configured schedule is extended to explicitly cover the whole day (or other relevant time extent). Alternatively, the control system may implicitly assume a default control configuration (e.g. OFF) for time intervals not explicitly configured in the schedule.

Where the schedule is defined in relation to a time extent of a day, the method may comprise receiving a selection, preferably based on the directional input element (e.g. in a menu), of one or more days to which the configured schedule is to apply, and associating the configured schedule with the selected day(s). The system may thus maintain a set of schedules each associated with one or more days, and the user can conveniently set a schedule to apply to multiple days, reducing the configuration effort. For example, the user may set schedules for each day of the seven days of the week (or for individual days of a month or year, or even for specific dates).

As set out above, setting of time and temperature parameters may advantageously be performed using the same directional input element. The time period configuration process may accordingly comprise, in a temperature setting mode, modifying a temperature value for the time period based on directional input from the directional input element and updating the representation of the time period to indicate the modified temperature value; and in a time setting mode, modifying a time parameter of the time period based on directional input from the directional input element, and updating the representation to indicate the modified time parameter.

This approach may be embodied in a further independent aspect of the invention (which may be combined with the above aspect), according to which there is provided a method of configuring a control schedule for an environmental control system using a control device, the control device having a display and a directional input element for receiving user input corresponding to at least two distinct activation directions of the directional input element, and wherein the control schedule comprises information defining a sequence of time periods and control information associated with one or more time periods for controlling the environmental control system, the method comprising: performing an editing process for editing a given time period of the control schedule, the editing process comprising: displaying a representation of the time period on the display; modifying one or more parameters associated with the time period based on user input received responsive to directional activation of the directional input element; and updating the representation of the edited time period on the display in response to the modification; the modifying comprising: in a temperature setting mode, modifying a temperature control parameter associated with the edited time period based on directional input from the directional input element, and in a time setting mode, modifying a time parameter of the time period based on directional input from the directional input element.

The directional input element is preferably as defined above, and is preferably a rotary input element for receiving rotary input in two distinct rotation directions, and the temperature control parameter is preferably a target temperature value. The following optional features may be applied to either of the above aspects of the invention.

The method may comprise receiving a user selection of the given time period, and performing the editing process for the user-selected time period (e.g. when editing an existing schedule rather than creating a new one). The user selection may be received from a plurality of displayed time periods of the schedule (e.g. from a displayed list of time periods or schedule summary) based on directional activation of the directional input element.

In either of the above aspects, where a time parameter of a time period is configured or modified, the time parameter may comprises at least one of: a start time of the time period; an end time of the time period; a duration value of the time period.

The method may include switching between the temperature setting mode and time setting mode based on receipt of a confirmation input signal.

The method may include (especially when editing a previously configured time period): allowing the user, in the time setting mode, to modify the start of the time period using the directional input element; responsive to receipt of the confirmation input signal, switching to the temperature setting mode and allowing the user to modify a temperature value for the time period using the directional input element; and responsive to receipt of a further confirmation input signal, switching to the time setting mode and allowing the user to modify the end time of the time period using the directional input element. The start time, end time, and temperature may alternatively be modified in a different order. Entry of the last parameter is preferably again confirmed by the confirmation input signal, which may end editing of that time period and optionally the process may then continue to edit another time period or allow selection of a further time period for editing. Start/end times of preceding and succeeding time periods may be modified automatically based on the changes to the edited time period to maintain a continuous schedule (e.g. avoid gaps or overlaps).

As set out previously, various parameters (time parameters such as start time/end time/duration and control parameters such as temperature values) may be selected by directional activation of the directional input element, and parameter entries may in each case be confirmed by a confirmation input signal. To simplify operation, the directional input element is preferably arranged to provide directional input signals responsive to directional activation and a further input signal in response to a secondary form of activation, the confirmation input signal(s) being based on the secondary form of activation of the directional input element (e.g. a form of activation other than activation in two activation directions corresponding to respective parameter adjustment directions). For example, where the directional input element is a rotary input element the secondary activation may comprise depressing the rotary input element (typically in the direction of the rotary axis, with the rotary element thus also acting as a push button; for example, the rotary element may include or be connected to a biased switch or the like so that it returns to the un-pressed state after being released).

Preferably, in either of the above aspects, the displayed representation of a time period comprises a graphical element. Updating the representation may comprise modifying an extent of the graphical element (for example a horizontal or vertical extent) representing the time period in response to modification of a time parameter indicating a duration of the time period, preferably such that the modified extent is representative of the duration of the time period. Updating the representation may comprise, in response to modification of a temperature parameter associated with a time period, modifying one or more of: an indication of the value of the modified parameter (e.g. a numerical or symbolic indication); and a colour or shading of the graphical element.

The method may comprise displaying the schedule in the form of a plurality of graphical elements corresponding to respective time periods, the graphical elements arranged in time order of the time periods in the schedule (and preferably horizontally or vertically aligned). The, or each, graphical element may comprise one or more of: a (preferably substantially rectangular) shape element; an indication that the corresponding time period is an OFF period during which the environmental control system is configured to be deactivated or in a protection mode, preferably in the form of a symbol associated with, and/or predetermined colouration of, the shape element; and an indication of a target temperature value associated with the corresponding time period, where the time period is an ON period during which the environmental control system is to be activated to operate based on the target temperature value. A colour of the shape element may be selected in dependence on one or both of an ON/OFF state and a target temperature value of the corresponding time period. The method may comprise displaying time values associated with one or more representations of time periods, the time values indicative of start and/or end times of associated time periods.

Preferably, in either of the above aspects, the control schedule is for controlling environmental temperature control by an environmental control system, the environmental control system preferably adapted for control of one or more of: heating, cooling, ventilation, and air conditioning (or more generally climate control). For example, the environmental control system may be a heating system.

The environmental control system may alternatively (or additionally) comprise a hot water supply system, the control schedule adapted for controlling water heating by the hot water supply system.

The method may further comprise controlling the environmental control system based on the configured control schedule, for example to adjust an ambient temperature of an environment during a time period based on a target temperature configured for the time period, or to activate and deactivate water heating for a hot water supply system based on on/off indications in the schedule.

More specifically, controlling the environmental control system in dependence on the control schedule may comprise one or both of: during a time period of the schedule configured as an ON period, controlling the environmental control system based on a control parameter (preferably a target temperature) specified for the time period in the schedule; and during a time period of the schedule configured as an OFF period, operating the environmental control system in a protection mode, preferably wherein in the protection mode a heating system is controlled in accordance with a protection threshold (e.g. as described elsewhere herein).

In a further aspect of the invention (which may be combined with either of the above aspects), the invention provides a method of controlling an environmental control system, the environmental control system arranged to operate in accordance with a control schedule in a scheduled mode of operation, the method comprising, at a control device associated with the environmental control system: receiving a user input indicative of activation of a boost mode, wherein in the boost mode, the environmental control system disregards the control schedule and operates instead in accordance with a boost setting, the boost setting including at least a target temperature; setting the target temperature for the boost mode based on user input; and activating the boost mode based on the set target temperature, whereby the environmental control system performs environmental control based on the target temperature during activation of the boost mode.

The method may include displaying on a display of the control device an indication of a default target temperature; receiving user input to adjust or confirm a currently displayed target temperature; in response to user input to adjust the currently displayed target temperature, modifying the target temperature and updating the display; and in response to user input to confirm the currently displayed target temperature, using the currently displayed target temperature when activating the boost mode. Thus, a variable-temperature boost mode may be provided without requiring complicated manual control of the system. To keep the boost mode activation simple and efficient, setting or adjusting the target temperature preferably comprises setting or adjusting the target temperature based on directional input from a directional input element of the control device. The directional input element is preferably as described and defined above, and is preferably a rotary input element for receiving rotary input corresponding to two distinct rotation directions, as set out above.

The boost setting may further include a boost duration, the boost duration preferably set based on user input. The method preferably further includes deactivating the boost mode and preferably reverting to a previously active mode, such as the scheduled mode of operation or a manual mode of operation, after expiry of the boost duration. The method may comprise receiving a confirmation input after allowing the user to set a target temperature and/or boost duration, and activating the boost mode responsive to the confirmation input.

As set out for previous aspects, the environmental control system may be a temperature control system or heating system or any other form of HVAC (heating, ventilation, air conditioning).

In further aspects, the invention provides a computer program product or computer readable medium comprising software code adapted, when executed on a data processing apparatus, to perform any method as set out herein, and a control device having means for performing any method as set out herein.

The invention also provides a control device for an environmental control system, the control device comprising: a display; a directional input element for receiving user input corresponding to at least two distinct activation directions of the directional input element; and a user interface program adapted, when run on the control device, to provide a user interface for configuring a control schedule for the environmental control system, wherein the control schedule is configurable to define a sequence of time periods, the user interface program arranged to: perform a time period configuration process for each of a plurality of time periods, the time period configuration process including, for each time period being configured: adding a time period to the control schedule; displaying on the display a representation of the added time period, the representation preferably being displayed adjacent a representation of a temporally preceding time period of the control schedule if the added time period is not an earliest configured time period of the control schedule; in response to directional activation of the directional input element, adjusting a duration of the added time period, and updating the representation to indicate the adjusted duration of the added time period; and in response to receiving a confirmation input signal, storing the adjusted duration of the given time period in the control schedule; the user interface program adapted to repeat the time period configuration process until it is determined that no more time periods are to be added to the control schedule.

The invention further provides a control device for an environmental control system, the control device comprising: a display; a directional input element for receiving user input corresponding to at least two distinct activation directions of the directional input element; and a user interface program adapted when run on the control device to provide a user interface for configuring a control schedule for the environmental control system, wherein the control schedule is configurable to define a sequence of time periods, the user interface program arranged to: perform an editing process for editing a given time period of the control schedule, the editing process comprising: displaying a representation of the time period on the display; modifying one or more parameters associated with the time period based on user input received responsive to directional activation of the directional input element; and updating the representation of the edited time period on the display in response to the modification; the modifying comprising: in a temperature setting mode, modifying a temperature control parameter associated with the edited time period based on directional input from the directional input element, and in a time setting mode, modifying a time parameter of the time period based on directional input from the directional input element.

The invention further provides a control device for controlling an environmental control system, the environmental control system arranged to operate in accordance with a control schedule in a scheduled mode of operation, the control device comprising: means for receiving a user input indicative of activation of a boost mode, wherein in the boost mode, the environmental control system disregards the control schedule and operates instead in accordance with a boost setting, the boost setting including at least a target temperature; means for setting the target temperature for the boost mode based on user input; and means for activating the boost mode based on the set target temperature, whereby the environmental control system is arranged to perform environmental control based on the target temperature during activation of the boost mode.

The invention also provides a control device, optionally as per any of the above aspects, comprising means (preferably in the form of a processor and/or user interface program) for performing any method as set out herein.

The invention further provides a system including: a control device as set out in any of the above aspects; and an environmental control system adapted to operate in accordance with control information from the control device, the environmental control system including at least one of an environmental temperature control (e.g. heating) system and a hot water supply system.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus and computer program aspects, and vice versa.

Furthermore, features implemented in hardware may generally be implemented in software, and vice versa. Any reference to software and hardware features herein should be construed accordingly.

Overview

Embodiments of the present invention provide a programmable thermostat having a simple and convenient user interface. The user interface enables efficient and convenient control of thermostat functions, such as programming heating and hot water schedules and activating a boost function of the device.

FIGS. 1A and 1B depict a programmable thermostat according to an embodiment of the invention. The thermostat 100 includes a display area 102 on a user-facing front face of the device, with an embedded rotary control input in the form of a dial 104. Additional input elements in the form of buttons 106-114 are also provided. The buttons include, on the front face of the device, a "back" button 106 for returning to a previous screen or cancelling a current entry, a "menu" button 108 for accessing menu options or returning to a home menu, and an "accept" button 110 for confirming a current entry. Further buttons 112 and 114 are provided along a top edge of the device for activating "boost" functions as described in more detail below.

The buttons may be in the form of push buttons (e.g. using mechanical switches), touch sensitive controls, or any other suitable button mechanism.

The dial 104 is arranged in a central location on the front face of the device, within the extent of the display area 102. The display area may comprise a single shaped display panel or multiple rectangular panels, to form a display that partially surrounds the dial.

The dial 104 can be rotated anticlockwise or clockwise to provide two distinct rotational inputs to the control software (as shown by the curved arrow in FIG. 1A). These inputs may, for example, correspond (respectively) to moving left and right in a menu, moving up and down in a menu, reducing and increasing a temperature or other control parameter value, and the like. The rotary motion is preferably subtly stepped rather than smooth to provide haptic feedback to the user and enable more accurate control. For example, this can enable accurate selection of menu options, or allow control of parameter values in clearly defined increments/decrements.

In preferred embodiments, the rotary dial 104 also includes a biased switch which is activated by pressing the dial 104 in the direction of its rotational axis (i.e. down or inwards towards the body of the device, as shown by the straight arrow in FIG. 1A). The dial 104 thus acts as a further push-button type control button, in addition to its rotary input function. The push activation can be used to confirm a selection made using the rotary input, for example to activate a menu option after the menu option has been highlighted by rotary motion or to accept a parameter value after the value has been set by rotary motion.

As shown in FIG. 1B, the display area 102 may display a variety of information depending on operational context. By way of example, the display 102 may include a status indication 116 including heating and water status and an information area 118 providing operating information, menus, explanatory text and user instructions (in the FIG. 1B example, a portion of a current heating schedule is displayed; schedules are described in more detail below). The display 102 may further include a target temperature indication 120 ("TARGET") and a current measured temperature indication 122 ("ACTUAL").

Schedule Programming Interface

The above control arrangement is used to provide an easy-to-use and efficient interface for programming a control schedule.

In the present examples, a control schedule consists of a series of time periods, with each time period associated with at least one control parameter. The control parameter value for a given period could simply be "on" or "off" to indicate activation or deactivation of a system during that time period, or could include other control information. In the present example, for control of environmental heating, the control parameter specifies a desired target temperature. Thus, in this example, the control parameter for a particular time period can be set to a required target temperature (within a predefined permitted range), or to "off" indicating that no heating is to be provided during the time period.

In other words, a heating schedule consists of a series of "on" periods during which the heating is set to a specified target temperatures, interspersed by "off" periods. A water schedule typically does not provide temperature control, but instead consists of a series of alternating "on" and "off" periods.

In a preferred embodiment, the system is preferably configured to activate the heating system if the ambient temperature falls below a certain minimum (e.g. 5° C.) regardless of the schedule and temperature set, to prevent damage to the system (e.g. to prevent water in the pipes or radiators from freezing). Thus, wherever reference is made herein to the heating being "off" or a schedule period being configured as an "off" period, this preferably corresponds to a frost protection mode in which the heating is generally off but is nevertheless activated below a protection threshold temperature to prevent damage to the system (instead of the system being completely off during that period). In alternative embodiments, separate modes could be provided for complete deactivation and frost protection and may be configurable/programmable in the same manner.

Furthermore, while an "on" period defines a period for which heating is generally meant to be activated to achieve a target temperature and an "off" period defines a period for which heating is generally meant to be deactivated (except for frost protection), the heating system may diverge from the exact schedule times for various reasons.

An example of using the schedule programming interface to configure a new heating schedule will now be described with reference to FIGS. 2A-2H. The interface is provided by a user interface program running on the device.

Figure 2A:
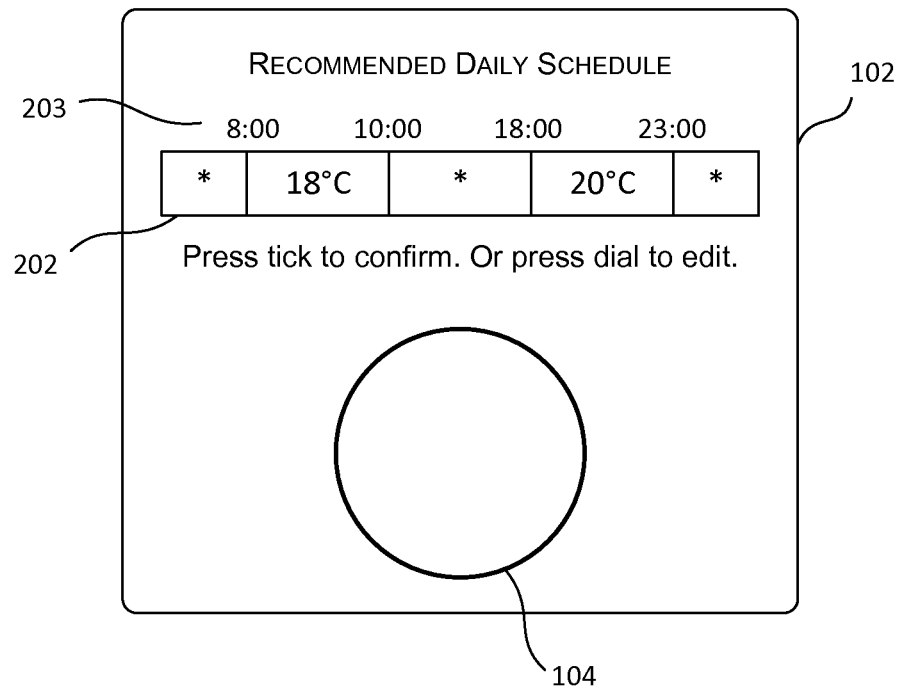
Figure 3:
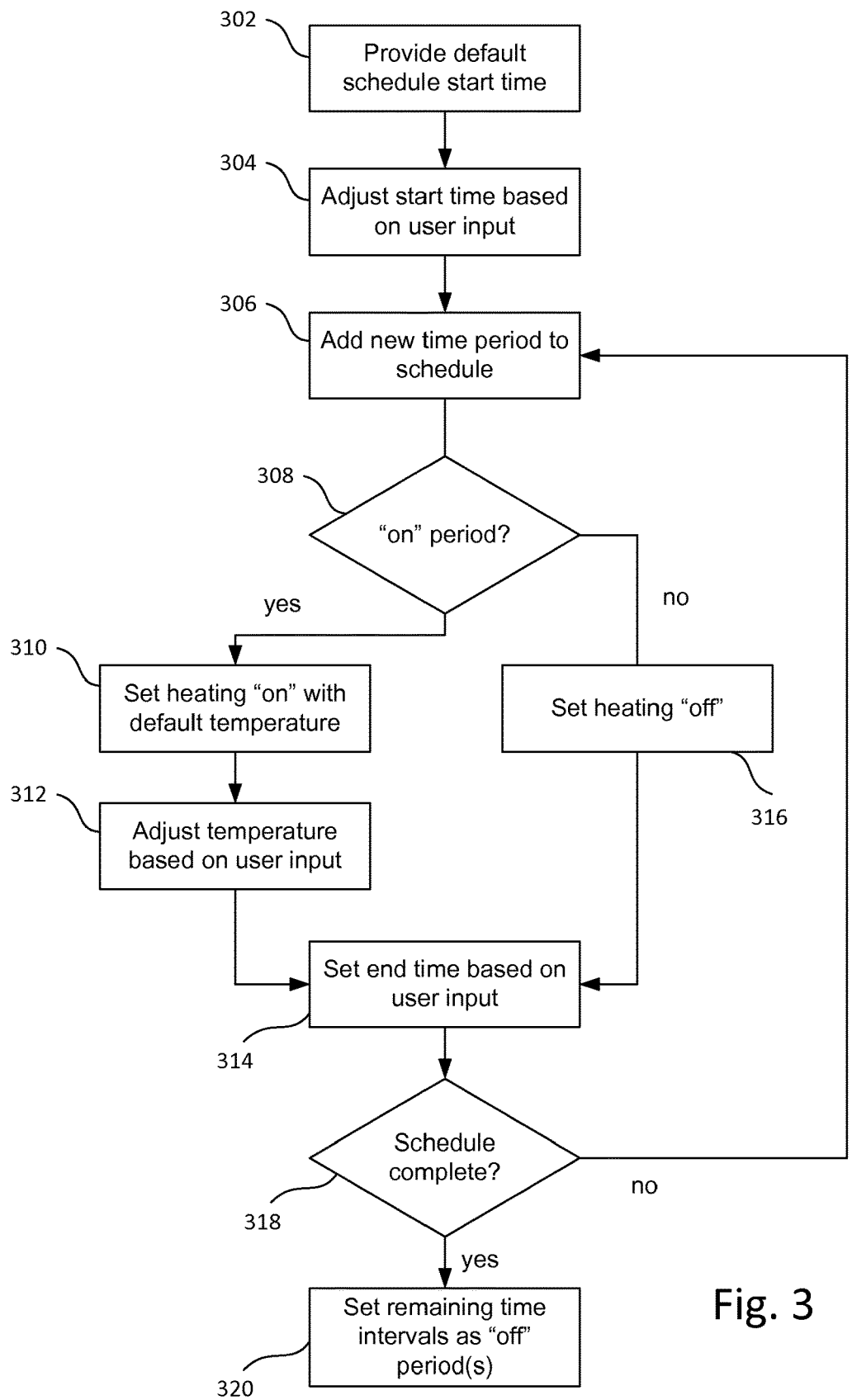

FIG. 2A depicts the interface at a point where the user has already navigated a main menu to access the schedule programming interface for the central heating system. In response to entering a schedule programming mode, the system displays a recommended heating schedule 202 on the display 102. By way of example, the recommended schedule here includes two "on" periods (08:00-10:00, with target temperature 18° C., and 18:00-23:00 with target temperature 20° C.). The remaining time periods are "off" periods. Time periods are graphically represented by boxes or bars that containing an indication of the target temperature for a period, or a symbol (here "*") to indicate that a period is an "off" (or frost protection) period. On and off periods may also be distinguished in other ways, e.g. using different colours (such as orange for "on" periods and blue for "off" periods; the colour for "on" periods may vary depending on the target temperature, e.g. green/orange/red for low/medium/high temperatures). Time indications 203 aligned with the time periods indicate the start/end times of each period.

The recommended schedule may be a default schedule stored at the device, or may be one of several stored template schedules. For example, the user may be prompted to select from amongst pre-defined template schedules such as templates optimised for energy efficiency or comfort (with different heating durations and temperatures), with the corresponding schedule proposed as the recommended schedule.

The user can simply accept the proposed schedule (by pressing the "accept" button 110). In this example, however, the user chooses to enter a desired schedule by pressing the dial 104.

Figure 2B:
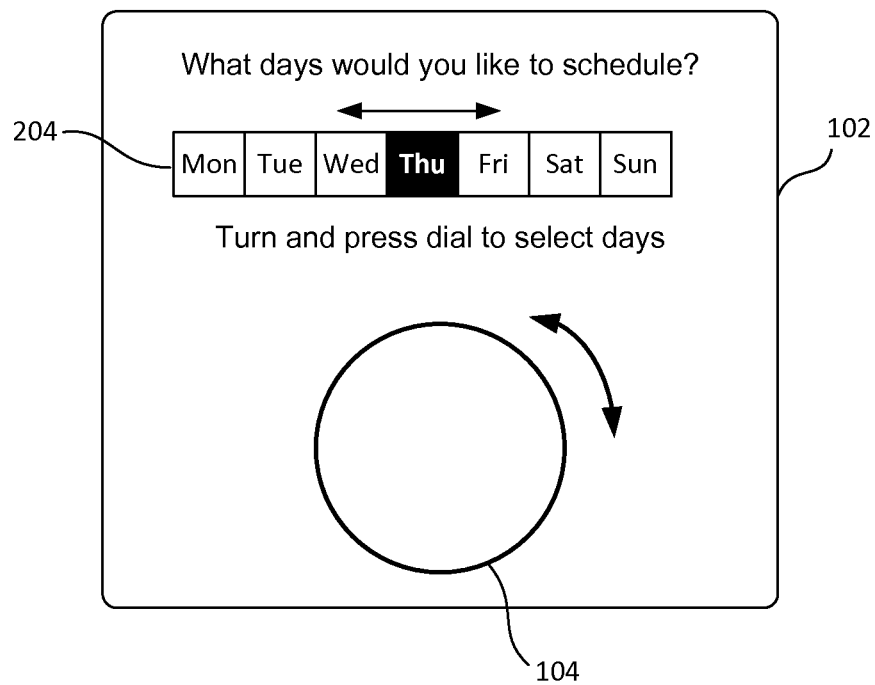

In response, a day selection screen is displayed as shown in FIG. 2B. Here, the user can select one or more of the displayed days of the week 204 by rotating the dial 104 to highlight the required day, and pressing the dial to select the currently highlighted day. The user may select a single day in this way, or may select multiple days, with the selected days permanently highlighted on the display. For example, the user may wish to set a heating schedule for weekdays only, or for weekend days only. After selecting the desired days, the user again presses the "accept" button.

Figure 2C:
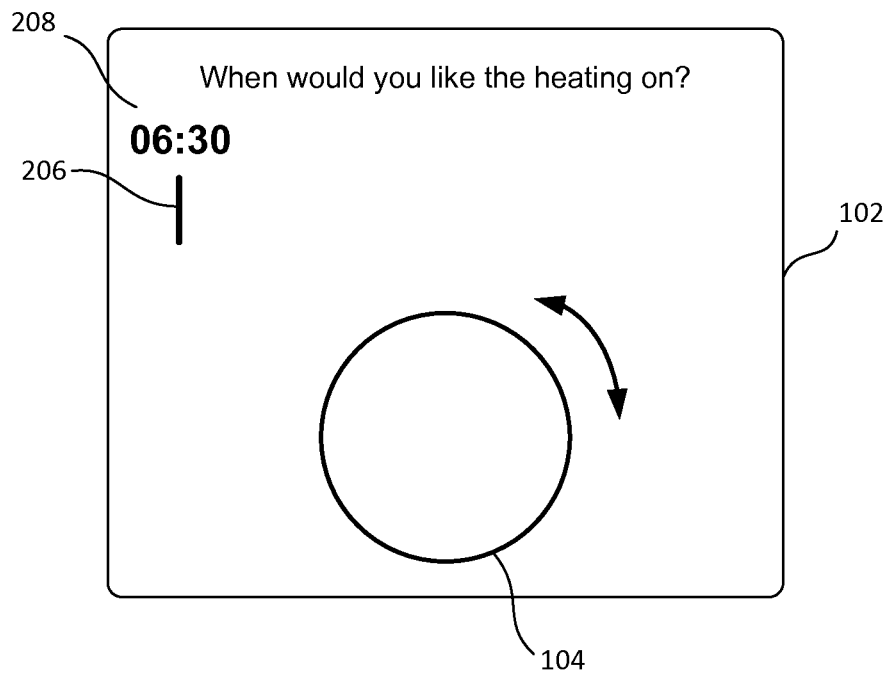

As shown in FIG. 2C, the display then shows an initial, blank, schedule. The start of the schedule is represented by vertical bar 206 and start time indication 208, which is set to a default value (here 06:30).

In the first step of the schedule programming process, the interface operates in time setting mode, in which the user uses the dial 104 to set the start time of the first "on" period by adjusting the suggested start time 208, with the displayed time value changing as the user turns the dial 104. Anticlockwise rotation reduces the start time whilst clockwise rotation increases the start time, preferably in time increments such as ±15 minutes. Once the desired value is reached, the user presses the dial 104 to confirm the chosen value.

Figure 2D:
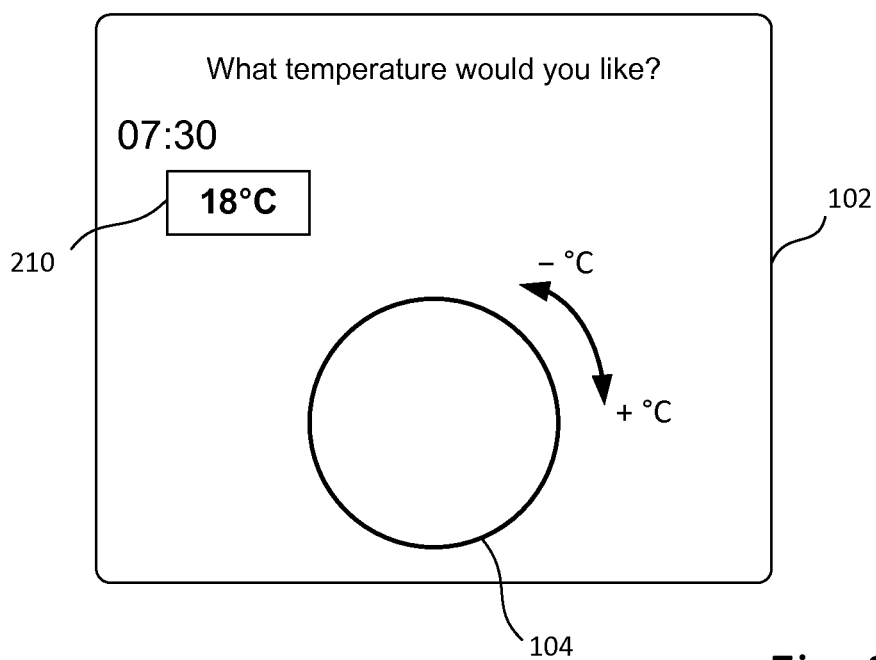
Figure 2E:
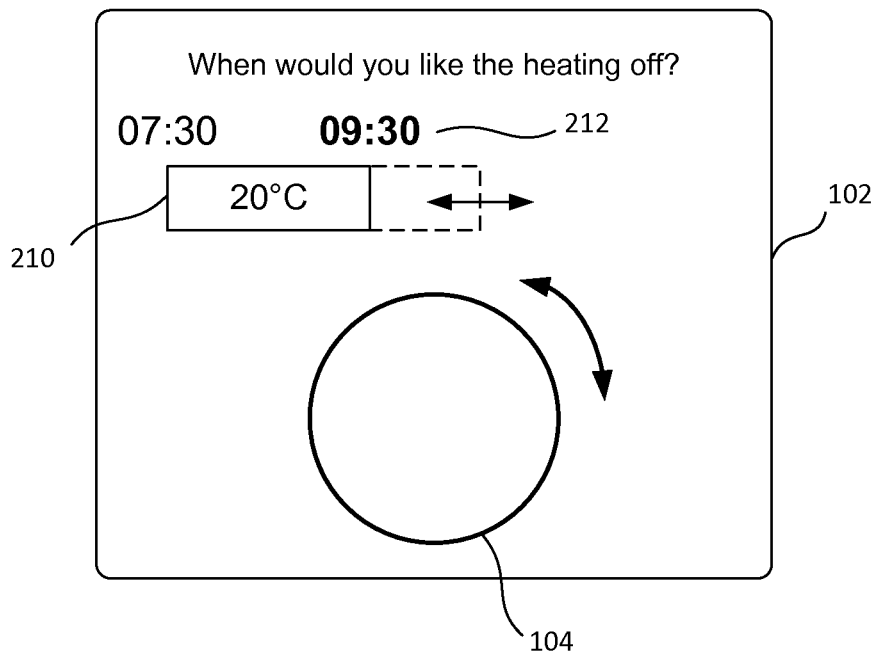

As shown in FIG. 2D, the user interface program then adds a first time period to the schedule, shown on the display as graphical element 210 having a rectangular shape, with the previously selected start time (here having been adjusted to 07:30) and (at this point) an unspecified end time.

The system also sets an initial, default value for the target temperature that is to apply during this first time period and displays this temperature overlaid on box 210 representing the time period—in the depicted example, the default value is 18° C. At this point, the interface operates in temperature setting mode, in which operation of the rotary dial 104 adjusts the temperature instead of the start time of the time period. As the user turns the dial 104 anticlockwise the temperature is reduced, and turning the dial 104 clockwise increases the temperature value. The display is continuously updated to show the currently selected temperature (the colouring of element 210 may also be adjusted accordingly). Adjustment is again in defined decrements/increments, preferably ±0.5° C. (note that temperature could be indicated in other units, e.g. Fahrenheit rather than Celsius, and this may be user-configurable).

When the desired temperature is reached, the user again presses the dial 104 to accept the current value. The user interface program records the chosen value as the target temperature value for the time period. Moving on to FIG. 2E, the user has in this example adjusted the temperature for the first time period 210 to 20° C. After confirming the value, the interface switches back to time setting mode to specify the end of the first time period (and start of the next time period), and therefore define the duration of the first time period.

The user then again uses the rotary dial 104 to adjust the end time of the time period, reducing it by turning the control anticlockwise and increasing it by turning the control clockwise (again in ±15 minute intervals). The representation of the time period is modified on the display, e.g. by the box 210 shrinking or expanding in the horizontal direction, as the user changes its duration, so that the width of box 210 is visually representative of the duration of the time period. A corresponding time indication 212 is shown centrally aligned with the time period boundary and is moved and has its value updated as the user adjusts the duration. The user then presses the dial 104 to accept the current duration (note that in either the time setting or the temperature setting mode the user may alternatively accept the default time/temperature value immediately without making adjustments).

Figure 2F:
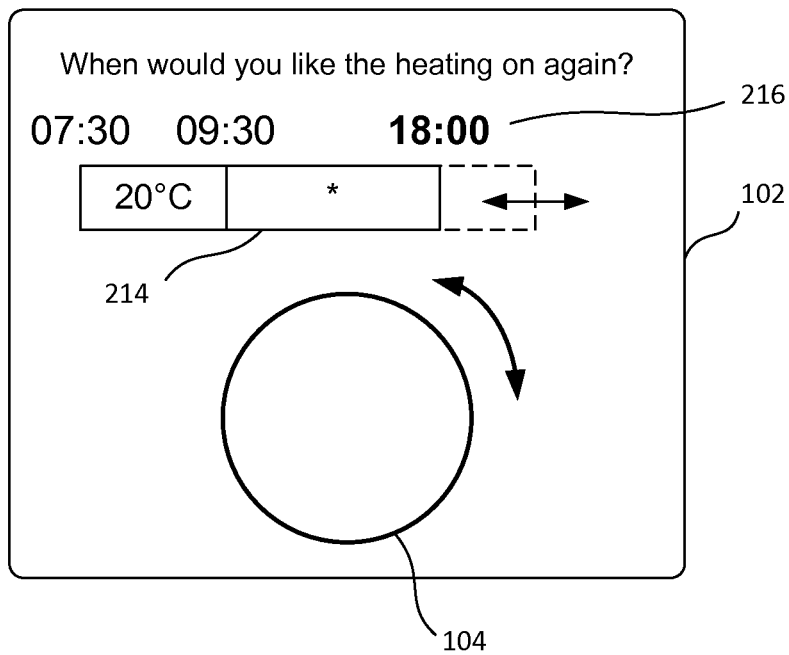

At this point, as shown in FIG. 2F, programming of the first time period (which is an "on" period) is complete. The system then creates a second time period 214 in the schedule with a default duration and adds it to the schedule representation on the display 102. This time period is an "off" time period, indicating that the heating will be off during that time.

The system now again operates in time setting mode, allowing the end time 216 of "off" time period 214 (and hence the start of the next "on" time period) to be adjusted by turning the dial 104 as before. As the user makes adjustments, the extent of box 214 again changes and the time indication 216 is updated.

Figure 2G:
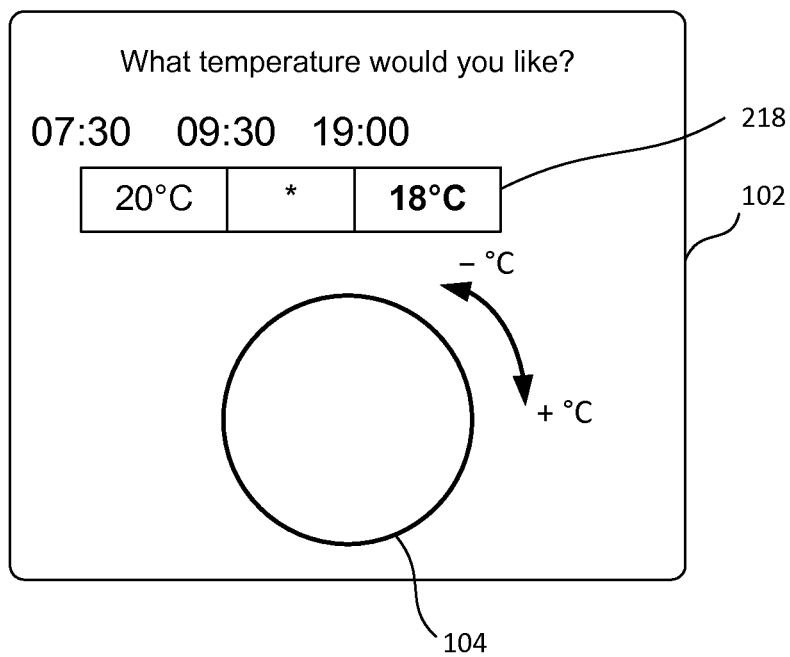

After confirming the duration of the "off" period and the start of the next "on" period (again by pressing dial 104), the system adds a new "on" period 218 with default duration to the schedule, and again enters temperature setting mode as shown in FIG. 2G, with a default temperature initially displayed, and the user able to modify the temperature using the rotary dial 104.

The process then continues as described above, with the user alternately setting the time duration of a period, and the temperature parameter for that period, in each case making a selection by rotary operation and confirming the selection by push operation of the dial 104, which switches the system between time setting and temperature setting modes as required. For "off" periods, only the duration is configured, and the interface automatically alternates between "on" and "off" periods as described above.

In a preferred embodiment, after completion of each "on" period, a message is displayed asking the user whether the schedule is complete or whether further periods are to be scheduled. The user can use the dial 104 to select between the options, and the scheduling process ends if the user indicates that no more periods are to be added; otherwise the process continues. Alternatively, the user interface program could continue to add new periods until the user provides a specific input e.g. by pressing the "accept" button 110.

Figure 2H:
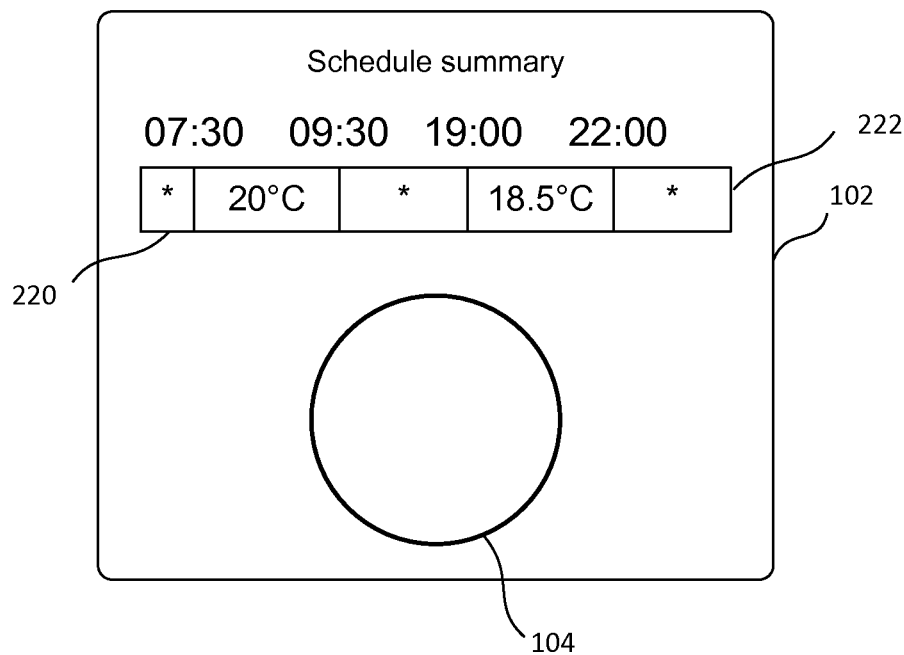

In either case, once the user indicates that the schedule is complete, the user interface program then creates one or more "off" periods for any remaining time intervals in the day for which no "on" or "off" periods have been configured in the schedule (e.g. from midnight until the schedule start time and from the end of the last programmed "on" period to midnight). A summary of the programmed schedule may then be displayed as illustrated in FIG. 2H (this shows the additional automatically configured "off" periods 220 and 222).

During programming, the "back" button 106 can be used to undo the last selection and move back a step in the process.

The schedule programming process is summarised in the flowchart of FIG. 3.

In step 302, the program provides a default start time for the schedule (typically an early morning time e.g. 06:30). In step 304 the user adjusts the start time using the rotary dial and presses the dial to confirm a value. In step 306, the program adds a time period with a default duration to the schedule. In the case of the first time period this will be an "on" period; subsequent time periods alternate between "on" and "off" periods.

In the case of an "on" period (see branch 308), the control parameters for the period are set to "on" with a default temperature (step 310). In step 312 the user adjusts the temperature using the dial and confirms the chosen value. In step 314, the user then sets an end time for the period in the same manner. In the case of an "off" period (step 316), the control parameters for the period are instead set to "off" (with no temperature value set). As no temperature adjustment occurs the process proceeds directly to step 314 to adjust the end time for the period.

In step 318, if it is determined that the schedule is not complete then the process continues to step 306 and a new time period is added (as an "off" period if the current period is an "on" period and vice versa). In one approach, an "off" period is always followed by an "on" period, but after an "on" period the user is prompted to indicate whether the schedule is finished as previously described.

The above loop may in principle be repeated as often as required, though some embodiments may limit the number of "on" periods that may be configured (to simplify operation). For example, a maximum of three "on" periods may be scheduled in one embodiment.

If in step 318 the schedule is considered complete (e.g. because the user has indicated completion, or a maximum number of configurable time periods has been reached), then in step 320 any remaining unprogrammed time intervals of the day are set as "off" periods.

In the above examples, the interface automatically alternates between "on" and "off" time periods, the latter requiring no temperature entry. However, alternatively, the interface could simply present a succession of time periods without any prior assumption that a period will be an "on" or "off" period, with the user instead explicitly indicating for each time period either a target temperature or an "off" state for the time period.

During temperature setting, the system preferably allows the temperature to be controlled within a defined range (in one example the range is 5.5° C. to 32.0° C.). Reducing the temperature for a time period below the minimum accepted value sets the temperature control parameter to the "off" setting, essentially turning the time period into an "off" period. Alternatively or additionally, the temperature input could cycle through the available temperature range (optionally including the "off" setting).

The described interface thus allows a complex heating schedule to be configured very simply by repeated operation of a single rotary input device making use of both a rotary input mode and alternative input mode of the rotary input device.

The resulting schedule is stored by the device in any suitable data structure or representation. One example is illustrated in FIG. 4, in which the schedule is stored as a table 400 having a record for each time period, each with the following fields or attributes: start time 402, end time 404, heating on/off indication 406 and target temperature 408. If the on/off indication specifies that a period is an "on" period, then the target temperature is specified in the target temperature column 408. On the other hand, if the on/off column indicates that a period is an "off" or frost protection ("F.P.") period, then no target temperature is specified. While the frost protection threshold is preferably fixed or configured separately, it could also be specified in the target temperature column.

FIG. 4 is merely intended as an example, and the schedule could be stored in any suitable manner and any appropriate data structures can be used. For example, either the start or end time could be omitted since the end time of a period generally corresponds to the start time of the next time period. Only the periods explicitly configured by the user, from the start of the first "on" period to the end of the last "on" period, may be explicitly specified in the schedule, with the remaining period (i.e. the overnight period, here 22:00-07:30) being implicitly taken as an "off" period. As a further extension of this, only "on" periods could be stored with their target temperatures in a list, with all other time periods being implicitly taken to be "off" periods. The stored schedule is associated with the day or days selected during initial day selection (FIG. 2B).

The schedule(s) may be stored locally at the thermostat but in preferred embodiments are stored at a remote control device and retrieved by the thermostat when needed for display or editing, as described in more detail below.

During normal operation, the thermostat can be set to operate in either a scheduled mode or a manual mode. In manual mode, the target temperature is controlled directly using the rotary dial and the programmed schedule (if one exists) is ignored by the device. In scheduled mode, the device controls the central heating system based on the defined schedule for the current day, by turning the central heating boiler on and off as required during "on" periods so as to attain and maintain the target temperature, based on comparison of the target temperature to a locally measured ambient temperature (measured by a temperature sensor of the thermostat). During "off" periods the boiler is turned off and no heating occurs (except for frost protection as discussed previously). A current portion of the schedule is preferably shown on the display during scheduled mode operation.

When operating in scheduled mode, the user may override the target temperature (or "off" setting) for the current time period by turning the rotary dial (whilst on the home screen). This changes the currently applicable target temperature, overriding the schedule, with the target temperature display 122 and schedule display 118 (FIG. 1B) updated accordingly. The new target applies to the current scheduled time period; after the end of the time period the system preferably reverts to the schedule and the settings programmed for the next time period.

A hot water schedule may be programmed in substantially the same manner as described above, except that no target temperature is provided for "on" periods. Instead, the schedule simply consists of a succession of "on" periods during which water is heated (e.g. for storage in a hot water tank from where it can be supplied to hot water taps) and "off" periods during which no water heating occurs. Thus, the FIG. 3 process applies except that no temperature is set and so step 312 is omitted.

Furthermore, in a further embodiment, a version of the device 100 may be provided without a temperature sensor. Such a device may provide a programmable timer for switching a heating system on or off based on a schedule, but without providing temperature measurement and temperature-based control. In that case, the interface operates as described previously, but without a target temperature being set for "on" periods, as described above for a hot water schedule. Such a programmable timer could be used with an external thermostat which would then be responsible for activating/deactivating the boiler during "on" periods based on a measured temperature.

While a process for configuring a new time schedule, starting from an empty schedule, has been described above, the system also provides functionality for editing an existing, previously configured time schedule.

In particular, If the user elects (by way of appropriate menu choices) to view/edit an existing schedule, instead of creating a new one, the user is first prompted as described above to select the day for which the schedule is to be modified as described above and illustrated in FIG. 2B. Then, a summary view of the previously configured schedule is displayed, in substantially the same manner as depicted in FIG. 2H.

Figure 2I:
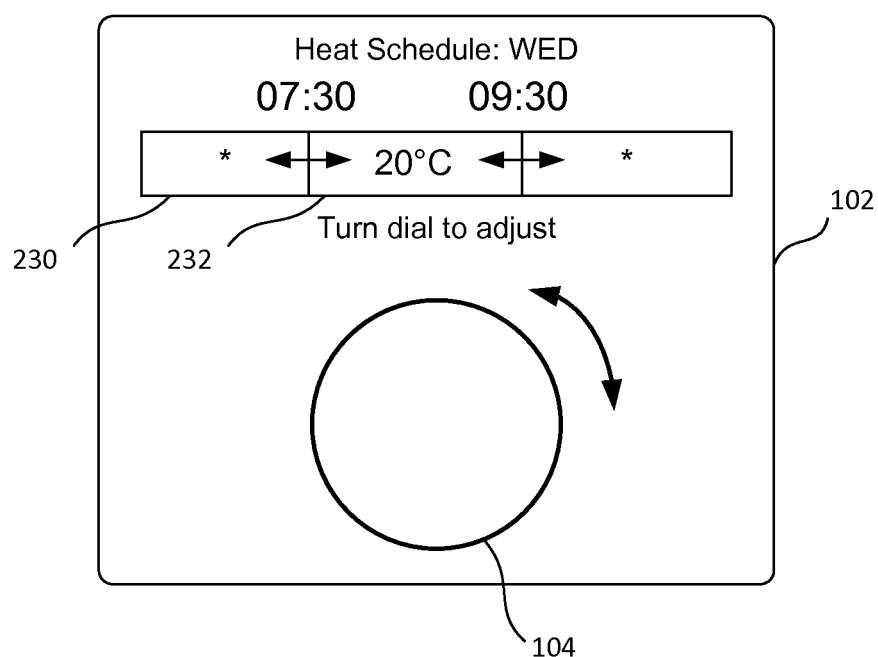

At this point, the user can then select one of the displayed time periods by turning the dial; the selected time period is highlighted (e.g. by flashing) as the user does so. The user then confirms the selection by pressing the dial. Subsequently, the display shows a zoomed-in view of the schedule as depicted in FIG. 2I. The zoomed view includes a portion of the schedule 230 including the selected time period 232 and (at least part of) the immediately preceding and subsequent time periods. The user can then adjust the start time, end time, and temperature value using the rotary dial 104. Specifically, in a preferred embodiment, the user can first change the start time using the dial 104, confirming the selected start time by pressing the dial 104. Next, the temperature can be modified using the dial 104, with the selection again confirmed by pressing the dial 104. Finally, the end time can be adjusted using the dial 104, and the user again confirms by pressing the dial 104, at which point editing of the time period is complete. However, in other embodiments, the time start and end times and temperature value may be edited in any order.

The representation of the time period (e.g. in terms of width of the rectangle representing the time period, colour, displayed temperature and time values) is preferably continuously updated to reflect the changes as described previously. In other respects, the interface also operates as described previously.

When the start time of a time period is adjusted, the end time of the previous period is adjusted accordingly, to the same time value. Similarly, when the end time of a time period is adjusted, the start time of the following period is adjusted accordingly, to the same time value, to ensure a continuous schedule without overlaps or gaps between periods. Preferably, a time period may not be reduced below a minimum duration in this way.

If the user edits the temperature value of an ON time period to below a defined minimum, the time period is changed to an OFF period (represented as described previously). Similarly, by turning the dial when editing the temperature parameter for an OFF period, the OFF indication may be replaced by a temperature indication, turning the OFF period into an ON period.

In preferred embodiments the interface additionally provides the ability to copy the schedule set for one day of the week to another day. Thus, after entering/editing a schedule for a given day, the user can select an option to copy that schedule to one or more selected other days in the week (selected by rotary dial as described previously). This removes the need to program days individually.

Boost Function

While particularly effective for programming a schedule, the described user interface can also simplify other control functions of the device. By way of example, FIGS. 5A-5B illustrate the operation of a "boost" function.

The boost function allows temporary activation of the hot water system or central heating system by way of water boost button 112 and heating boost button 114 (as shown in FIG. 1A). While conventional boost functions typically permit activation for a fixed time duration and with the heating set to be permanently "on" regardless of sensed temperature, the present interface provides a more flexible boost function.

FIG. 5A illustrates the display 102 after the user presses the central heating boost button 114 to enter boost mode. The display 102 provides an information area 502 showing instructions for use of the boost mode, a target temperature display 504 indicating the target temperature for the boost mode, and a status/time display 506 indicating a selected boost duration (after first pressing the boost button a default boost duration of 1 hour is displayed, as in this example).

The target temperature is set to an initial default value (here 22° C.). The user can reduce or increase the default temperature by anticlockwise/clockwise rotation of the dial 104 in defined increments (e.g. ±0.5° C.), as previously described for the scheduling interface.

Repeated presses of the boost function set a boost duration in predefined increments, preferably of one hour, up to a defined maximum. For example, repeated presses may cycle the status/duration through values of "Off", 1, 2, 3, 4, 5 and 6 hours (thereafter returning to the "Off" setting). Alternatively the boost duration may also be set using the dial 104, with a press of the dial 104 switching between temperature setting and duration setting (in either order) as described for the schedule programming interface.

FIG. 5B shows the display 102 after the user has adjusted the target temperature and pressed the heat boost button (e.g., 112, 114 of FIG. 1A) a further time to set the boost duration to two hours. The user can then confirm these settings using the "accept" button 110, after which the device enters boost mode based on the configured parameters. Alternatively the user could use the "back" button 106 to cancel boost mode.

During boost mode, the boost settings override any scheduled (or manual) control settings. Thus, the system will heat to the selected boost target temperature even if it is in a scheduled "off" period (or a scheduled period with a different target temperature). Boost mode continues until the end of the indicated time duration, or until cancelled by the user. After that, the device returns to its previous mode of operation—either manual operation or scheduled operation. In the latter case control of the system immediately reverts to the control parameters configured for the current scheduled period.

The hot water boost function is controlled in substantially the same manner, except that only the duration is set, and a target temperature is not set. Similarly, in an embodiment providing only a programmable timer without temperature sensing/control, the heating boost function would also omit the temperature setting.

Network and Hardware Architecture

FIG. 6 illustrates integration of the programmable thermostat 100 into a heating system 600.

The thermostat 100 connects wirelessly to a wireless receiver 602. The wireless receiver 602 is connected by a wired connection to central heating/hot water boiler 604. The boiler 604 may, for example, be a conventional gas boiler arranged to provide a supply of heated water to a series of radiators in the user's home and to a hot water tank for onward supply to hot water taps.

The thermostat 100 and wireless receiver 602 are further connected wirelessly to a heating system hub 606. The hub 606 is connected to the user's home network/internet access infrastructure. For example, in a typical configuration the heating system hub 606 is connected via a wired connection to a wireless or wired home router/access point 608, which in turn provides access to the Internet 612 through a modem 610, such as an ADSL or fibre modem. Depending on access technology, router 608 and modem 610 may be combined in a single device or replaced with other access devices appropriate to the access technology.

The heating system hub 606 thus acts as a gateway between the heating system 600 and other local network devices (e.g. a user device 616) as well as the external network.

The thermostat 100, receiver 602 and hub 606 are connected in a mesh configuration, so that communication between thermostat 100 and receiver 602 may be direct or via the hub 606. Similarly, communication between the hub 606 (and hence external elements) and the thermostat 100 may occur directly or via the receiver 602. The mesh arrangement provides greater freedom in placement of components whilst maintaining good connectivity.

The thermostat 100 measures ambient temperature using a temperature sensor and sends temperature information to the wireless receiver 602.

The wireless receiver 602 stores programmed schedules and controls the boiler 604 to switch environmental heating and hot water on and off based on the schedules. The schedules and other control information are received from wireless thermostat 100 and/or heating system hub 606. For example, the user programs a schedule at wireless thermostat 100, and the thermostat 100 sends the schedule to the wireless receiver 602. The wireless receiver 602 then uses the schedule and temperature information received from the thermostat 100 to turn the boiler 604 on or off as needed.

However, these control functions could alternatively be integrated into the thermostat 100.

The user may additionally interact with the system from a separate user device 616 connected to the local network or from a user device 618 located outside the user's home and connected to the Internet. User devices 616 and 618 may take the form of smartphones, tablet computers, personal computers, and the like. User devices may include an application for controlling the heating system, for example to create or edit a heating/hot water schedule, switch between manual/scheduled operation, adjust temperature, activate boost mode, etc. The application may then send information to the wireless thermostat or to the wireless receiver 602 or hub 606 as required (e.g. to update a schedule).

Alternatively, a control interface may be provided through a remote server 614. This may be a web interface accessible by user devices 616, 618, to perform the operations discussed above, e.g. setting a schedule. The server then transmits control information (e.g. a modified schedule) to the heating system 600 (e.g. to the wireless receiver 602).

FIG. 7 illustrates a hardware architecture of the programmable thermostat 100.

The thermostat includes a processor 700 together with volatile/random access memory 702 for storing temporary data and software code being executed. Persistent storage 704 (e.g. in the form of FLASH memory) persistently stores the user interface program 706 which is arranged to provide the user interface discussed above and to communicate with the wireless receiver 602 shown in FIG. 6 to control the heating system based on user input and locally sensed temperature. Persistent storage 704 may further store control information 708, including the control schedule(s) programmed by the user (e.g. table 400 shown in FIG. 4). However, in a preferred embodiment, the control schedules (and possibly other control information) are instead stored in the wireless receiver 602 (FIG. 6). In that case, the thermostat 100 retrieves the schedules from the receiver when it needs to display or edit them and sends configured schedules back to the receiver, so that only temporary copies of the information are stored at the thermostat (e.g. in memory 702).

Persistent storage 704 may include other software and data, such as an operating system, device drivers, software configuration data, historical temperature measurement data, and the like.

Communication with the wireless receiver 602 (FIG. 6) occurs via a wireless network interface 710 and wireless transceiver 712. Display information is output to display 102 via a display interface 714, and user input is received through an input interface 716 (e.g. from dial 104 or buttons 718, the latter collectively representing buttons 106, 108, 110, 112 and 114 shown in FIG. 1A).

A temperature sensor 720 measures the ambient temperature at the device and provides the temperature information to the processor 700, which stores the information in memory 702 and/or persistent storage 704 for use in controlling the heating system.

The device components are interconnected by a data bus (this may in practice consist of several distinct buses such as a memory bus and I/O bus).

While a specific architecture is shown, any appropriate hardware/software architecture may be employed. For example, external communication may be via a wired network connection. User input may be received via a touch-enabled display instead of or in addition to the controls shown.

It will be understood that the present invention has been described above purely by way of example, and modification of detail can be made within the scope of the invention.

For example, the above schedule programming interface can be applied to other contexts where there is a requirement to program a control schedule having a succession of time periods, where different time periods may be associated with different values for one or more control parameter(s). The control parameter(s) may simply be "on" or "off" indications for turning a controlled system on or off, or may include any other suitable control parameters. For example, in the home automation context, a lighting control system may be programmed to switch lights on and off based on a schedule during absence of a home owner to create the impression that a property is occupied and deter burglars. Such a system could also control a brightness level of any controlled lights, which would be represented as a control parameter associated with each control period in the schedule.

The invention claimed is:

1. A method of configuring a control schedule to control an environmental control system using a control device, the control device having a display and a directional input element, wherein the directional input element comprises a single, discrete input component for receiving user input corresponding to at least two distinct activation directions of the directional input element, and wherein the control schedule is configurable to define a sequence of time periods, the method comprising:

the control device performing a time period configuration process for each of a plurality of time periods of the control schedule, for each time period being configured the control device:

adding a time period to the control schedule;

displaying on the display a representation of the added time period, the representation being displayed adjacent a representation of a temporally preceding time period of the control schedule if the added time period is not an earliest configured time period of the control schedule;

in response to directional activation of the directional input element, adjusting a duration of the added time period, and updating the representation to indicate the adjusted duration of the added time period; and in response to receiving a confirmation input signal, storing the adjusted duration of the given time period in the control schedule;

wherein the control device associates control information with the control schedule designating respective time periods as one of:

an ON period during which the environmental control system is to be activated and operating in accordance with a target temperature value configured in the control schedule; and an OFF period during which the environmental control system is to be one or more of: deactivated; and operating in a protection mode, wherein, in the protection mode, the environmental control system is generally off but is activated below a protection threshold temperature to prevent damage to the system;

wherein the control device allows the user to configure additionally the target temperature value based on directional activation of the directional input element when performing the time period configuration process for any ON periods but not for any OFF periods;

the control device repeating the time period configuration process sequentially for a temporal sequence of time periods starting with an earliest time period whilst alternating automatically between adding one of the ON periods and one of the OFF periods to the control schedule, until it is determined that no more time periods are to be added to the control schedule;

the method further comprising controlling the environmental control system in dependence on the control schedule.

2. A method according to claim 1, wherein the directional input element is a rotary input element for receiving rotary input corresponding to two distinct rotation directions.

3. A method according to claim 1, comprising repeating the time configuration process sequentially for a temporal sequence of time periods starting with an earliest time period, the method comprising at least one of:

for a first time period of the schedule to be added, configuring a start time of the first time period based on user input provided by directional activation of the directional input element, the time period configuration process adding the first time period with the configured start time; and for a time period other than the first configured time period, setting a start time of the time period to an end time of the temporally preceding time period when adding the time period.

4. A method according to claim 1, wherein adjusting the duration of the added time period comprises adjusting an end time of the added time period.

5. A method according to claim 1, comprising associating control information with one or more of the configured time periods, wherein associating control information with one or more time periods comprises associating with each time period at least one of:

an indication that the environmental control system is to be one or more of:

deactivated during the time period; and in a protection mode during the time period, wherein, in the protection mode, the environmental control system is generally off but is activated below a protection threshold temperature to prevent damage to the system;

an indication that the environmental control system is to be activated during the time period; and a temperature parameter indicating a target temperature to be used during the time period.

6. A method according to claim 1, comprising at least one of:

when one of the ON periods is added to the schedule, setting a target temperature value for the period to a default value, displaying an indication of the default value, and allowing a user to adjust the target temperature value based on directional input from the directional input element, the method further comprising storing the default value or adjusted value in response to a confirmation input signal; and when one of the OFF periods is added to the schedule, allowing a user to adjust only the duration of the time period based on directional input from the directional input element.

7. A method of configuring a control schedule for an environmental control system using a control device, the control device having a display and a directional input element, wherein the directional input element comprises a single, discrete input component for receiving user input corresponding to at least two distinct activation directions of the directional input element, and wherein the control schedule comprises information defining a sequence of time periods and control information associated with one or more time periods for controlling the environmental control system, the method comprising:
  performing, by the control device, an editing process for editing a given time period of the control schedule, the editing process comprising:
    displaying a representation of the time period on the display;
    modifying a plurality of parameters associated with the time period based on user input received responsive to directional activation of the directional input element, comprising:
      in a time setting mode, modifying the start of the time period using the directional input element based on directional input from the directional input element;
      responsive to receipt of a confirmation input signal, switching to a temperature setting mode;
      in the temperature setting mode, modifying a temperature control parameter associated with the edited time period based on directional input from the directional input element, and
      responsive to receipt of a further confirmation input signal, switching to the time setting mode and, in the time setting mode, modifying the end time of the time period based on directional input from the directional input element; and
    updating the representation of the edited time period on the display in response to the modification; and
    the method further comprising controlling the environmental control system in dependence on the control schedule.

8. A method according to claim 7, wherein the temperature control parameter is a target temperature value.

9. A method according to claim 7, wherein the directional input element is arranged to provide directional input signals responsive to directional activation and a further input signal in response to a secondary form of activation, the confirmation input signal(s) being based on the secondary form of activation, wherein the directional input element is a rotary input element and the secondary activation comprises depressing the rotary input element.

10. A method according to claim 7, wherein the displayed representation of a time period comprises a graphical element, wherein updating the representation comprises modifying an extent of the graphical element representing the time period in response to modification of a time parameter indicating a duration of the time period, such that the modified extent is representative of the duration of the time period.

11. A method according to claim 10, wherein updating the representation comprises, in response to modification of a temperature parameter associated with a time period, modifying one or more of:
  an indication of the value of the modified parameter; and
  a colour or shading of the graphical element.

12. A method according to claim 1, comprising displaying the control schedule in the form of a plurality of graphical elements corresponding to respective time periods, the graphical elements arranged in time order of the time periods in the schedule; wherein the, or each, graphical element comprises one or more of:
  a shape element;
  an indication that the corresponding time period is an OFF period during which the environmental control system is configured to be deactivated or in a protection mode, wherein, in the protection mode, the environmental control system is generally off but is activated below a protection threshold temperature to prevent damage to the system; and
  an indication of a target temperature value associated with the corresponding time period, where the time period is an ON period during which the environmental control system is to be activated to operate based on the target temperature value.

13. A method according to claim 12, wherein a colour of the shape element is selected in dependence on one or both of an ON/OFF state and a target temperature value of the corresponding time period.

14. A method according to claim 1, wherein the control schedule is for controlling environmental temperature control by an environmental control system, the environmental control system adapted for control of one or more of: heating, cooling, ventilation, and air conditioning.

15. A control device for an environmental control system, the control device comprising:
  a display;
  a directional input element, wherein the directional input element comprises a single, discrete input component for receiving user input corresponding to at least two distinct activation directions of the directional input element, and
  a user interface program configured to provide a user interface for configuring a control schedule for the environmental control system, when the user interface program is run on the control device, wherein the control schedule is configurable to define a sequence of time periods, the user interface program configured to:
    perform a time period configuration process for each of a plurality of time periods, the time period configuration process including, for each time period being configured:
      adding a time period to the control schedule;
      displaying on the display a representation of the added time period, the representation being displayed adjacent a representation of a temporally preceding time period of the control schedule if the added time period is not an earliest configured time period of the control schedule;
      in response to directional activation of the directional input element, adjusting a duration of the added time period, and updating the representation to indicate the adjusted duration of the added time period; and
      in response to receiving a confirmation input signal, storing the adjusted duration of the given time period in the control schedule;
  wherein the user interface program associates control information with the control schedule designating each time period as one of:
    an ON period during which the environmental control system is to be activated and operating in accordance with a target temperature value configured in the control schedule; and
    an OFF period during which the environmental control system is to be one or more of: deactivated; and operating in a protection mode, wherein, in the protection mode, the environmental control system is generally off but is activated below a protection threshold temperature to prevent damage to the system;
  wherein the user interface program allows the user additionally to configure the target temperature value based on directional activation of the directional input element when performing the time period configuration process for any ON periods but not for any OFF periods;

wherein the user interface program is configured to repeat the time period configuration process sequentially for a temporal sequence of time periods starting with an earliest time period whilst alternating automatically between adding one of the ON periods and one of the OFF periods to the control schedule, until it is determined that no more time periods are to be added to the control schedule;

and wherein the control device is configured to store the control schedule to enable control of the environmental control system in dependence on the control schedule.

16. The method of claim 1, wherein the control device further, for a time period during which the environmental control system is to be activated, associates the target temperature value with the time period based on directional input from the directional input element, wherein:

in a first stage of the time period configuration process, the control device allows a user to adjust one of the duration and the target temperature value for the time period based on directional input from the directional input element; and responsive to a confirmation input signal, in a second stage of the time period configuration process, the control device allows the user to adjust the other one of the duration and target temperature value for the time period based on directional input from the directional input element.

* * * * *